United States Patent
Sugihara

(10) Patent No.: US 10,048,493 B2
(45) Date of Patent: Aug. 14, 2018

(54) THREE-DIMENSIONAL DRIVE DEVICE

(71) Applicant: Shinano Kenshi Co., Ltd., Nagano (JP)

(72) Inventor: Hiroaki Sugihara, Nagano (JP)

(73) Assignee: SHINANO KENSHI CO., LTD., Nagano (JP)

( * ) Notice: Subject to any disclaimer, the term of this patent is extended or adjusted under 35 U.S.C. 154(b) by 0 days.

(21) Appl. No.: 15/314,280

(22) PCT Filed: May 28, 2015

(86) PCT No.: PCT/JP2015/065421
§ 371 (c)(1),
(2) Date: Nov. 28, 2016

(87) PCT Pub. No.: WO2015/182708
PCT Pub. Date: Dec. 3, 2015

(65) Prior Publication Data
US 2017/0212344 A1    Jul. 27, 2017

(30) Foreign Application Priority Data

May 30, 2014 (JP) ................................. 2014-112775

(51) Int. Cl.
G02B 26/10 (2006.01)
G02B 7/182 (2006.01)
G01S 7/481 (2006.01)

(52) U.S. Cl.
CPC .......... *G02B 26/105* (2013.01); *G01S 7/4817* (2013.01); *G02B 7/1821* (2013.01); *G02B 26/101* (2013.01)

(58) Field of Classification Search
None
See application file for complete search history.

(56) References Cited

U.S. PATENT DOCUMENTS 4,499,490 A     2/1985  Morgan
9,658,335 B2 *  5/2017  Siercks ................... G01S 17/89
                        (Continued)

FOREIGN PATENT DOCUMENTS

CN    202189218 U    4/2012
JP    58-205880 A    11/1983
                    (Continued)

OTHER PUBLICATIONS

The U.S. Publication and the foreign references 1-2, 4 and 6 were cited in the International Search Report of the corresponding International Application, PCT/JP2015/065421 dated Aug. 11, 2015.
(Continued)

*Primary Examiner* — Jennifer D. Carruth
(74) *Attorney, Agent, or Firm* — Cowan, Liebowitz & Latman, P.C.; Mark Montague

(57) ABSTRACT

A three-dimensional drive device of this invention comprises: a hollow shaft; a first motor rotating the hollow shaft; a first spur gear having a central axis common to a central axis of the hollow shaft, arranged in a center of the hollow shaft; a second motor rotating the first spur gear; a bevel gear meshing with the first spur gear, arranged within the hollow shaft; and a second spur gear meshing with the bevel gear, arranged within the hollow shaft, and having an axis of rotation orthogonal to the central axis of the hollow shaft, the bevel gear and the second spur gear being to turn upon moving in the circumferential direction of the hollow shaft along with rotation of the hollow shaft, and the central axis of the hollow shaft and the axis of rotation of the second spur gear being orthogonal to each other.

6 Claims, 6 Drawing Sheets

(56) References Cited

U.S. PATENT DOCUMENTS

| | | | |
|---|---|---|---|
| 9,921,062 B2* | 3/2018 | Yoshino | ............... G01C 15/008 |
| 2003/0066954 A1 | 4/2003 | Hipp | |
| 2008/0075326 A1 | 3/2008 | Otani et al. | |

FOREIGN PATENT DOCUMENTS

| | | |
|---|---|---|
| JP | 61-099116 A | 5/1986 |
| JP | 64-056411 A | 3/1989 |
| JP | 2003-344797 A | 12/2003 |
| JP | 2008-082707 A | 4/2008 |
| JP | 2009-236774 A | 10/2009 |
| JP | 2010-048897 A | 3/2010 |

OTHER PUBLICATIONS

The above references were cited in an Extended European Search Report dated Dec. 6, 2017, that issued in the corresponding European Patent Application No. 15 79 9869.

* cited by examiner

THREE-DIMENSIONAL DRIVE DEVICE

CROSS REFERENCE TO RELATED APPLICATIONS

This is a U.S. national stage of application No. PCT/JP2015/065421, filed on May 28, 2015. Priority under 35 U.S.C. § 119(a) and 35 U.S.C. § 365(b) is claimed from Japanese Patent Application No. 2014-112775, filed on May 30, 2014, the disclosure of which are also incorporated herein by reference

TECHNICAL FIELD

The present invention relates to a three-dimensional drive device.

BACKGROUND ART

A three-dimensional optical scanner is proposed in applications such as area sensing for crime prevention and three-dimensional ranging for construction and civil engineering.

In PTL 1, for example, it is disclosed an optical scanner in which a resonant galvano scanner having a mirror is supported by a galvano scanner with a rotary shaft perpendicular to and intersecting the rotary axis of the resonant galvano scanner. In PTL 2, it is disclosed a three-dimensional rangefinder having a light projection unit and a light reception unit.

CITATION LIST

Patent Literature

{PTL 1}: JP 2003-344797 A
{PTL 2}: JP 2009-236774 A

SUMMARY OF INVENTION

Technical Problem

The optical scanner disclosed in PTL 1 needs an individual light source placed apart from the main unit of the optical scanner for radiating light into three-dimensional space. It makes the apparatus configuration complicated. The three-dimensional rangefinder disclosed in PTL 2 has a light projection unit placed above a mirror. Such a light projection unit cannot scan right above the rangefinder in vertical scanning. Furthermore, the light projection unit is blocked to scan 360-degree in a horizontal direction by a supporting column for the light projection unit placed above the mirror.

The present invention has been made on the basis of such background, where an object of the present invention is to provide a three-dimensional drive device that can radiate light to a wide range of three-dimensional space with a simple configuration.

Solution to Problem

The present invention provides a three-dimensional drive device including: a hollow shaft; a first motor for rotating the hollow shaft in a circumferential direction; a first spur gear having a central axis common to a central axis of the hollow shaft, arranged in a center of the hollow shaft; a second motor for rotating the first spur gear in the circumferential direction; a bevel gear meshing with the first spur gear, arranged within the hollow shaft; and a second spur gear meshing with the bevel gear, arranged within the hollow shaft, and having an axis of rotation orthogonal to the central axis of the hollow shaft, the bevel gear and the second spur gear being to turn upon moving in the circumferential direction of the hollow shaft along with rotation of the hollow shaft, and the central axis of the hollow shaft and the axis of rotation of the second spur gear being orthogonal to each other.

The first spur gear may have a hollow structure on a side of the central axis and the three-dimensional drive device may further comprises: a light source for emitting light in a direction of the central axis of the first spur gear; and a mirror attached to the axis of rotation of the second spur gear for reflecting light emitted from the light source, an angle of a reflecting surface thereof being changed by rotation of the second spur gear.

On this configuration, the hollow shaft is preferably provided with a notch at a part of an outer wall thereof in order to not block a path of light reflected off of the mirror.

The three-dimensional drive device can further include a control unit for adjusting a difference between a rotational speed of the first motor and a rotational speed of the second motor.

The three-dimensional drive device may further include: a light reception unit provided along with the light source for receiving return light of the light emitted from the light source; and an outside condition detection unit for detecting a condition of the outside on the basis of a radiation direction of the light emitted from the light source and radiated to the outside as well as a result of a comparison between the light emitted from the light source and the return light received by the light reception unit.

The three-dimensional drive device may further include a wall surface formed along an outer periphery of the hollow shaft and having a height varying according to a position in the circumferential direction.

Advantageous Effects of Invention

According to the present invention, light can be radiated to the wide range of three-dimensional space with the simple configuration.

DESCRIPTION OF EMBODIMENTS

First Embodiment

A three-dimensional drive device 1 according to a first embodiment of the present invention will be described with reference to FIGS. 1 to 4. Note that a gear illustrated in FIG. 1 is omitted in FIG. 3.

Figure 1:
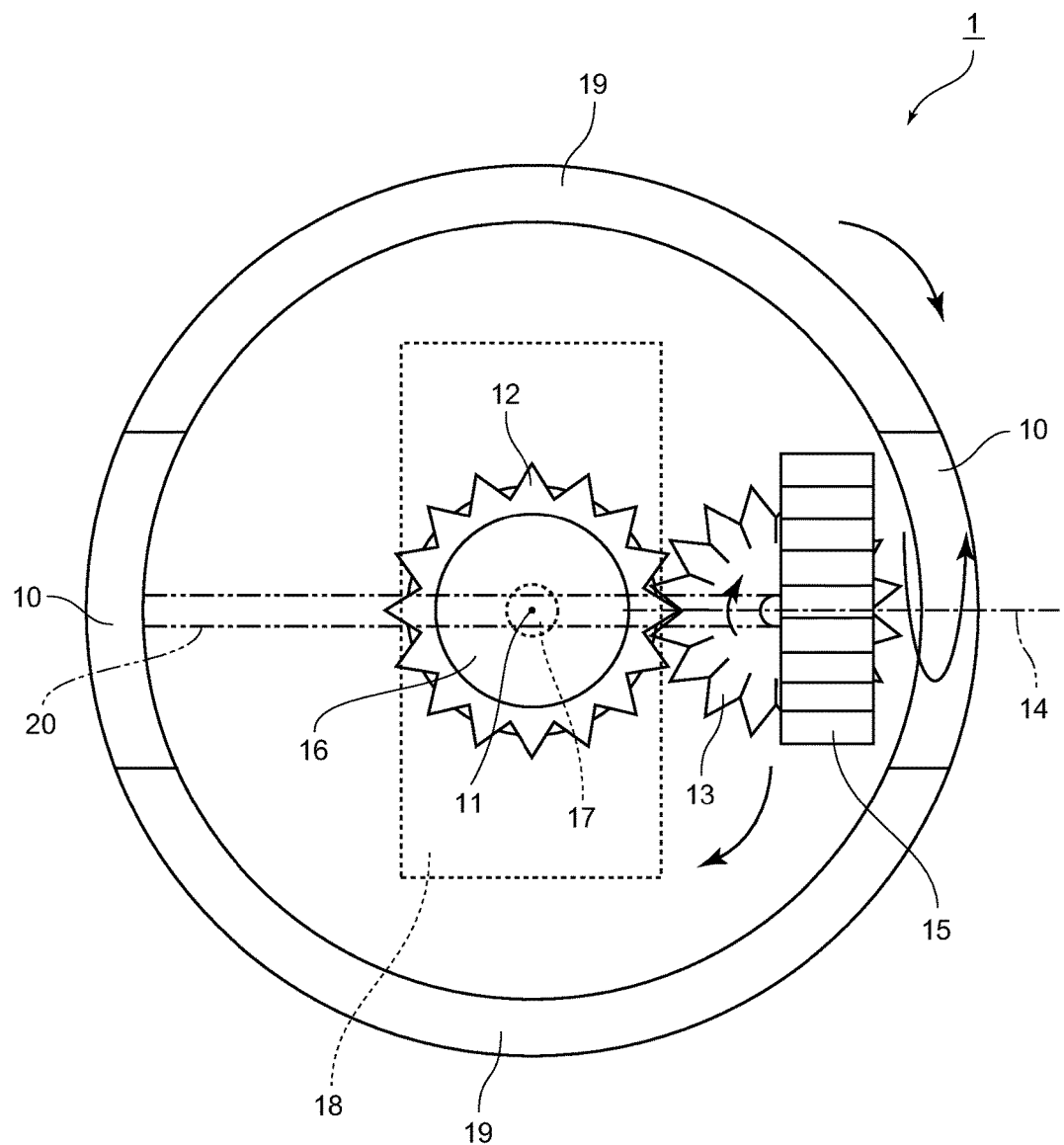
FIG. 1 is a diagram illustrating a configuration of a principal part of a three-dimensional drive device according to a first embodiment of the present invention.
Figure 3:
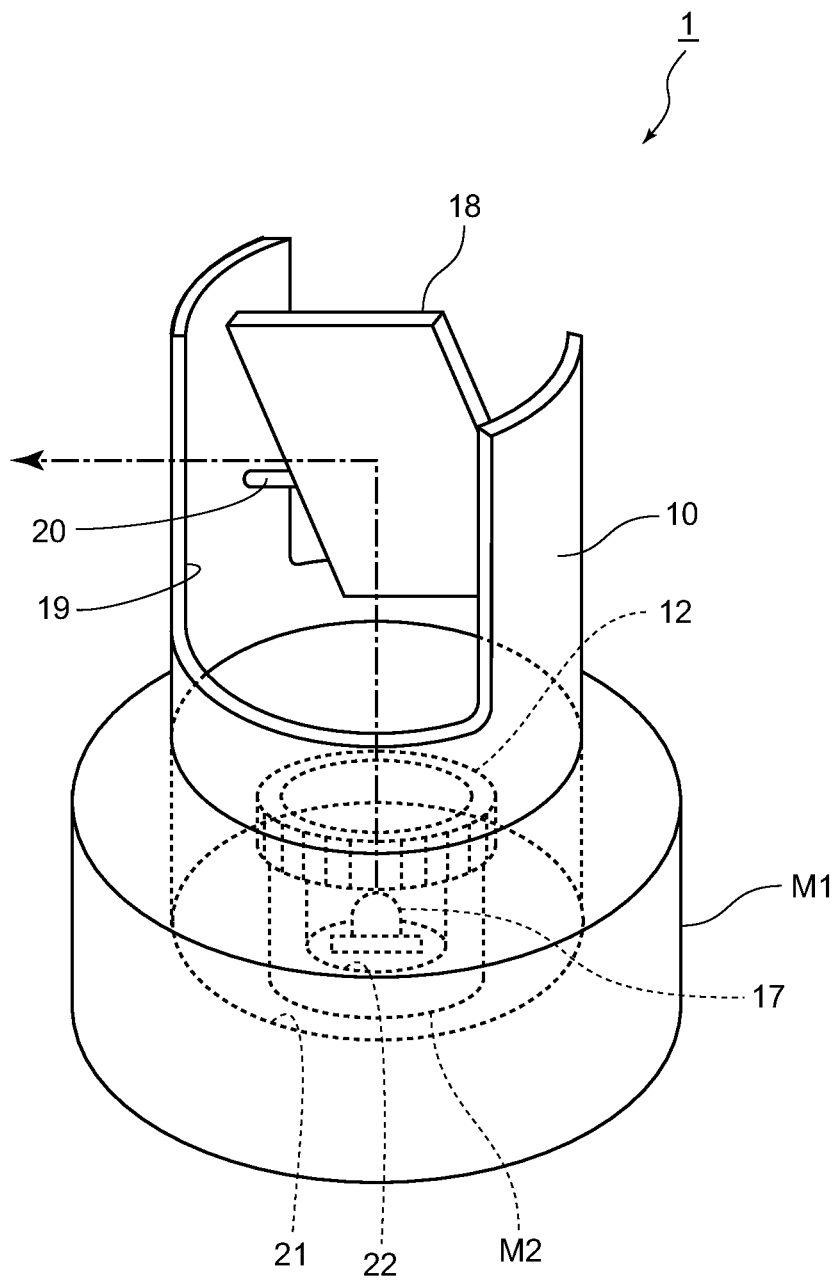
FIG. 3 is a perspective view of the three-dimensional drive device illustrated in FIG. 1.

As illustrated in FIGS. 1 and 3, the three-dimensional drive device 1 includes a hollow shaft 10, a first hollow shaft motor M1 (refer to FIG. 3) that rotates the hollow shaft 10 in a circumferential direction, a first spur gear 12 that has a central axis common to a central axis 11 of the hollow shaft 10 and is arranged in the center of the hollow shaft 10, a second hollow shaft motor M2 (refer to FIG. 3) that rotates the spur gear 12 in the circumferential direction, a bevel gear 13 that is in mesh with the spur gear 12 and arranged within the hollow shaft 10, and a second spur gear 15 that is in mesh with the bevel gear 13, arranged within the hollow shaft 10, and has an axis of rotation 14 orthogonal to the central axis 11 of the hollow shaft 10, where the bevel gear 13 and the spur gear 15 turn while moving in the circumferential direction of the hollow shaft 10 along with rotation of the hollow shaft 10, and the central axis 11 of the hollow shaft 10 and the axis of rotation 14 of the spur gear 15 are orthogonal to each other.

Moreover, as illustrated in FIG. 1, the three-dimensional drive device 1 has a hollow structure 16 in the spur gear 12 on the side of the central axis 11 thereof and includes a light source 17 that emits light in the direction of the central axis of the spur gear 12 and a mirror 18 attached to the axis of rotation of the spur gear 15 for reflecting light emitted from the light source 17, the angle of a reflecting surface of which is changed by rotation of the spur gear 15. Note that the light source 17 is a light-emitting diode (LED) or a laser, for example, provided within a hollow structure of the hollow shaft motor M2 or outside the hollow shaft motor M2. The mirror 18, described to be attached to the axis of rotation 14, is actually attached to a shaft 20 including the axis of rotation 14 of the spur gear 15. The mirror 18 can be attached to the shaft 20 in a manner that the shaft 20 is sandwiched between two front and back reflectors of the mirror 18, for example.

Figure 2:
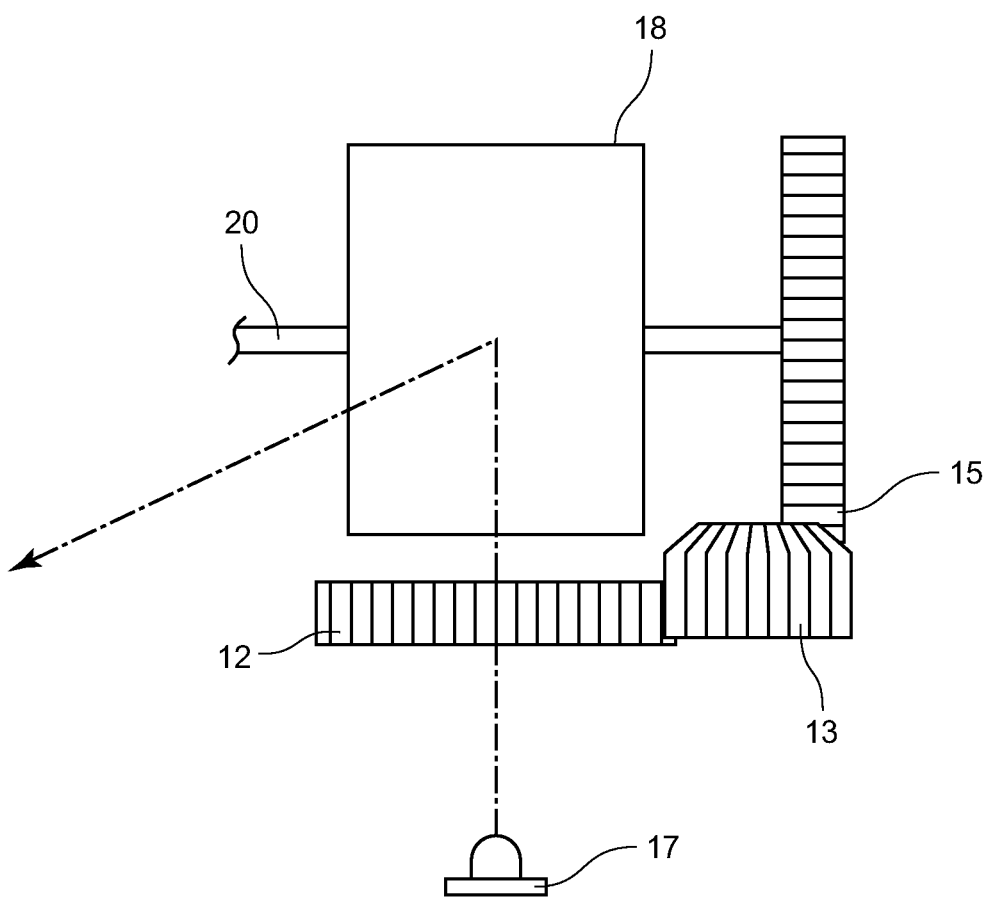
FIG. 2 is a diagram illustrating an arrangement relationship among a first spur gear, a bevel gear, a second spur gear, a mirror and a light source of the three-dimensional drive device illustrated in FIG. 1.

FIG. 2 illustrates the arrangement relationship among the spur gear 12, the bevel gear 13, the spur gear 15, the light source 17, the mirror 18 and the shaft 20 as viewed from a direction shifted 90 degrees in a vertical direction from FIG. 1. The orientations of arrangement of the spur gear 12 and the spur gear 15 are different from each other by 90 degrees.

As illustrated in FIG. 3, for example, the three-dimensional drive device 1 can rotate the hollow shaft 10 by mounting the hollow shaft 10 to a rotor (not shown) of the hollow shaft motor M1 and driving the hollow shaft motor M1, and rotate the spur gear 12 by mounting the spur gear 12 to a rotor (not shown) of the hollow shaft motor M2 and driving the hollow shaft motor M2. Note that the hollow shaft motor M2 can be arranged in a hollow structure 21 of the hollow shaft motor M1, for example. The light source 17 can be arranged in a hollow structure 22 of the hollow shaft motor M2, for example. According to this configuration, the hollow shaft 10 is rotated by the single hollow shaft motor M1 to cause the spur gear 15 to rotate about the axis of rotation 14 and cause the spur gear 12 to rotate about the central axis 11 via the bevel gear 13. The central axis 11 and the axis of rotation 14 can thus generate two different rotary motions that are orthogonal to each other.

The hollow shaft 10 is provided with a notch 19 at a part of an outer wall thereof in order to not block a path of light reflected off of the mirror 18.

The hollow shaft 10 is rotated as described above to change a horizontal orientation of the mirror 18, whereas the spur gear 15 is rotated to change a vertical orientation of the mirror 18. The direction of light emitted from the light source 17 toward the mirror 18 is then changed horizontally and vertically at the same time and emitted into three-dimensional space. Moreover, the hollow shaft motor M1 and the hollow shaft motor M2 working together can variously change a scanning pattern in horizontal and vertical directions. That is, the rotational speed of the spur gear 15 (namely, the speed of changing the vertical angle of the reflecting surface of the mirror 18) can be adjusted by adjusting a difference between the rotational speed of the hollow shaft motor M1 rotating the hollow shaft 10 and the rotational speed of the hollow shaft motor M2 rotating the spur gear 12.

The difference between the rotational speed of the hollow shaft motor M1 and the rotational speed of the hollow shaft motor M2 is the largest when the rotational speeds of both the hollow shaft motor M1 rotating the hollow shaft 10 and the hollow shaft motor M2 rotating the spur gear 12 are at the maximum with the direction of rotation of the hollow shaft motor M2 being opposite to the direction of rotation of the hollow shaft motor M1, for example. The spur gear 15 rotates at the maximum rotational speed as a result. Accordingly, the mirror 18 is rotated at the maximum rotational speed when the hollow shaft 10 undergoes one rotation, so that the vertical angle of the reflecting surface also changes at the maximum speed.

Alternatively, for example, the rotational speed of the spur gear 15 is reduced to zero by adjusting the difference between the rotational speed of the hollow shaft motor M1 and the rotational speed of the hollow shaft motor M2 such that the rotational speed of the hollow shaft 10 is in synchronization with the rotational speed of the spur gear 12. As a result, the angle of the reflecting surface of the mirror 18 does not change in the vertical direction but can be changed only in the horizontal direction.

Furthermore, for example, the spur gear 15 rotates in a direction opposite to the direction in the aforementioned state by adjusting the difference between the rotational speed of the hollow shaft motor M1 and the rotational speed of the hollow shaft motor M2 such that the rotational speed of the spur gear 12 outpaces the rotational speed of the hollow shaft 10 with the directions of rotation of the hollow shaft motors M1 and M2 being the same. The angle of the reflecting surface of the mirror 18 in the vertical direction is thus changed in a direction opposite to that in the aforementioned state.

The rotational speed of the spur gear 15 (namely, the speed of changing the vertical angle of the reflecting surface of the mirror 18) can be adjusted as described above by adjusting the difference between the rotational speed of the hollow shaft motor M1 rotating the hollow shaft 10 and the rotational speed of the hollow shaft motor M2 rotating the spur gear 12. Note that the rotational speed can be adjusted not only to a positive side but to a negative side, whereby the direction of rotation of the spur gear 15 (namely, the direction in which the vertical angle of the rotary reflecting surface of the mirror 18 is changed) can be changed by adjusting the difference between the rotational speed of the hollow shaft motor M1 rotating the hollow shaft 10 and the rotational speed of the hollow shaft motor M2 rotating the spur gear 12.

The light emitted from the light source 17 to the mirror 18 is thus reflected off by the mirror 18 to be radiated into the three-dimensional space. On this case, the motion of the mirror 18 can be changed in various ways by adjusting the difference between the rotational speed of the hollow shaft motor M1 rotating the hollow shaft 10 and the rotational speed of the hollow shaft motor M2 rotating the spur gear 12. Therefore, according to the three-dimensional drive device 1, a ratio of vertical or horizontal rotation of the mirror 18 can be freely adjusted to be able to radiate the light from the light source 17 in various patterns into the three-dimensional space.

Figure 4:
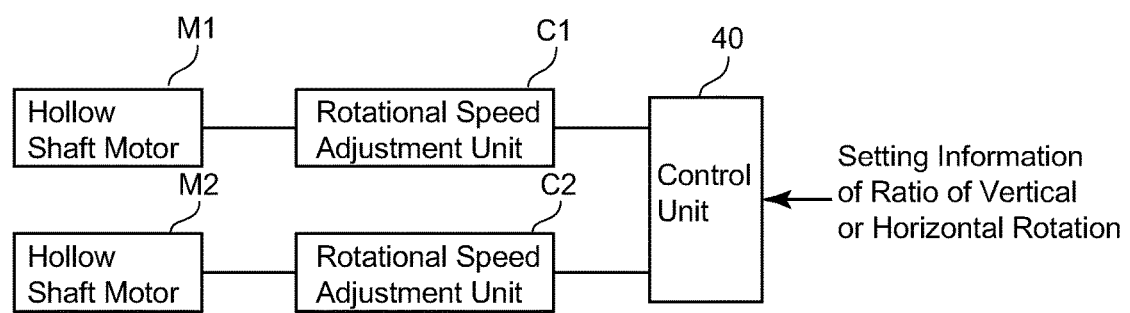
FIG. 4 is a diagram illustrating a configuration for adjusting a rotational speed of each of two hollow shaft motors illustrated in FIG. 3.

FIG. 4 illustrates a configuration that adjusts the rotational speed of each of the hollow shaft motor M1 and the hollow shaft motor M2. According to information for setting the ratio of vertical or horizontal rotation of the mirror 18 input by a user, the control unit 40 controls a rotational speed adjustment unit C1 of the hollow shaft motor M1 and a rotational speed adjustment unit C2 of the hollow shaft motor M2 to be able to adjust the difference between the rotational speed of the hollow shaft motor M1 and the rotational speed of the hollow shaft motor M2.

It is assumed, for example, that the mirror 18 is rotated once in the vertical direction while being rotated once in the horizontal direction with the hollow shaft motor M2 at rest. On this case, when the user requests half a rotation of the mirror 18 in the vertical direction while the mirror 18 undergoes one rotation in the horizontal direction, the control unit 40 sets the rotational speed of the hollow shaft motor M2 to one-half the rotational speed of the hollow shaft motor M1 with the directions of rotation of the hollow shaft motors M1 and M2 being the same. This allows the spur gear 15 to rotate at a speed that is one-half the speed up to that point by the rotation of the hollow shaft 10 and the rotation of the spur gear 12, whereby the mirror 18 undergoes half a rotation in the vertical direction while undergoing one rotation in the horizontal direction.

Alternatively, when the user requests two rotations of the mirror 18 in the vertical direction while the mirror 18 undergoes one rotation in the horizontal direction, the control unit 40 sets the rotational speed of the hollow shaft motor M1 and the rotational speed of the hollow shaft motor M2 to the same speed with the directions of rotation of the hollow shaft motors M1 and M2 being opposite to each other. This allows the spur gear 15 to rotate at a speed that is twice the speed up to that point by the rotation of the hollow shaft 10 and the rotation of the spur gear 12, whereby the mirror 18 undergoes two rotations in the vertical direction while undergoing one rotation in the horizontal direction.

Yet alternatively, when the user requests rotation of the mirror 18 only in the horizontal direction but not in the vertical direction, the control unit 40 sets the directions of rotation and rotational speeds of the hollow shaft motors M1 and M2 to be the same. As a result, the spur gear 15 does not rotate by the rotation of the hollow shaft 10 and the rotation of the spur gear 12, whereby the mirror 18 is rotated only in the horizontal direction.

Yet alternatively, when the user requests rotation of the mirror 18 in a direction opposite to the direction up to that point, the control unit 40 sets the rotational speed of the hollow shaft motor M2 slower than the rotational speed of the hollow shaft motor M1 when the rotational speed of the hollow shaft motor M2 outpaces the rotational speed of the hollow shaft motor M1 up to that point, or sets the rotational speed of the hollow shaft motor M2 faster than the rotational speed of the hollow shaft motor M1 when the rotational speed of the hollow shaft motor M2 is slower than the rotational speed of the hollow shaft motor M1 up to that point. This allows the spur gear 15 to rotate in a direction opposite to the direction up to that point by the rotation of the hollow shaft 10 and the rotation of the spur gear 12, whereby the mirror 18 is rotated in a direction opposite to the direction up to that point.

Note that the control unit 40 and the rotational speed adjustment units C1 and C2 illustrated in FIG. 4 may be arranged in a casing of the three-dimensional drive device 1 or outside the three-dimensional drive device 1.

The rotational speed of the mirror 18 will be described as well. Where $\omega h$ is the rotational speed of the mirror 18 in the horizontal direction and $\omega v$ is the rotational speed in the vertical direction, $\omega h$ is the rotational speed itself of the hollow shaft 10, to which the mirror 18 is attached via the shaft 20, and depends on the rotational speed of the hollow shaft motor M1. On the other hand, $\omega v$ depends on a product of a rotational speed difference $\omega g$ between the hollow shaft motor M1 and the hollow shaft motor M2, and a gear ratio among the spur gear 12, the bevel gear 13 and the spur gear 15. Here, what is important in considering light emission into the three-dimensional space on the basis of $\omega h$ and $\omega v$ is a ratio of $\omega h$ to $\omega v$, or a ratio of horizontal-to-vertical rotation ($\omega h : \omega v$) of the mirror 18.

The ratio such as 8:7 or 30:29 can be used as the horizontal-to-vertical ratio in order to radiate light into the three-dimensional space with fixed spatial density, for example. The light beam radiated into the space can have a fine meshed pattern when such ratio with a large least common multiple is used.

A large horizontal-to-vertical ratio such as 100:1 or 500:1 may also be set. This is because the mirror 18 is preferably used at a relatively low rotational speed regularly in view of durability and accuracy, while the hollow shaft motor M1 and the hollow shaft motor M2 can be used regularly at a relatively high rotational speed. A worm gear (not shown) instead of a gear wheel may be used in this case where the horizontal-to-vertical ratio is extremely large.

Furthermore, there will be described an operation other than the operation of continuously rotating the mirror 18. The vertical rotation of the mirror 18 depends on the rotational speed difference cog and the gear ratio as described above so that, when a motor such as a stepping motor capable of controlling the rotational angle with high accuracy is adopted as the hollow shaft motor M1 and the hollow shaft motor M2, the motor can perform control to radiate light in a concentrated manner to a specific narrow region of the three-dimensional space. This can be realized by controlling the rotation of the mirror 18 in the horizontal direction to reciprocate at a fixed speed within a specific range and accordingly controlling the rotation of the mirror 18 in the vertical direction to reciprocate at a fixed speed within a specific range in a similar manner.

As described above, the three-dimensional drive device 1 includes the hollow shaft 10, the hollow shaft motor M1 that rotates the hollow shaft 10 in the circumferential direction, the spur gear 12 that has the central axis common to the central axis of the hollow shaft 10 and is arranged in the center of the hollow shaft 10, the hollow shaft motor M2 that rotates the spur gear 12 in the circumferential direction, the bevel gear 13 that is in mesh with the spur gear 12 and arranged within the hollow shaft 10, and the spur gear 15 that is in mesh with the bevel gear 13, arranged within the hollow shaft 10, and has the axis of rotation orthogonal to the central axis of the hollow shaft 10, whereby light can be radiated to a wide range of the three-dimensional space with a simple configuration. In particular, the light source 17 is provided to emit light in the direction of the central axis of the spur gear 12, so that the device can perform vertical scanning up to immediately above itself and horizontal scanning all around itself (over 360 degrees). Moreover, the various emission patterns can be set according to the difference in the rotational speeds between the hollow shaft motor M1 and the hollow shaft motor M2.

Note that the shaft 20 is orthogonal to the central axis 11, whereby light radiated along the central axis 11 cannot reach immediately above the device while the mirror 18 is upright. In order to address this problem, there may be provided a hole (not shown) at a site at which the shaft 20 is orthogonal to the central axis 11 to allow light to pass through when the mirror 18 is upright, or the site on the shaft 20 or the entirety thereof may be made of a member allowing light to pass through.

One can also change the gear ratio between the spur gear 12 and the spur gear 15 as appropriate to be able to change the number of rotations of the mirror 18 in the vertical direction per rotation thereof in the horizontal direction while the hollow shaft motor M2 is at rest. When the gear ratio between the spur gear 12 and the spur gear 15 equals 2:1, for example, the mirror 18 undergoes half a rotation in the vertical direction while being rotated once in the horizontal direction with the hollow shaft motor M2 at rest. Alternatively, when the gear ratio between the spur gear 12 and the spur gear 15 equals 1:1, the mirror 18 is rotated once in the vertical direction while being rotated once in the horizontal direction with the hollow shaft motor M2 at rest. Yet alternatively, when the gear ratio between the spur gear 12 and the spur gear 15 equals 1:2, the mirror 18 is rotated twice in the vertical direction while being rotated once in the horizontal direction with the hollow shaft motor M2 at rest.

Accordingly, the light emission pattern meeting the demand of the user can be realized efficiently by setting the gear ratio between the spur gear 12 and the spur gear 15 as appropriate and then adjusting the difference in the rotational speeds between the hollow shaft motor M1 and the hollow shaft motor M2. The gear ratio between the spur gear 12 and the spur gear 15 may be set to 2:1 in advance in order to meet a demand that one wishes to frequently use an emission pattern with which the mirror 18 is rotated faster in the horizontal direction than in the vertical direction, for example. Alternatively, the gear ratio between the spur gear 12 and the spur gear 15 may be set to 1:1 in order to meet a demand that one wishes to use various emission patterns. Yet alternatively, the gear ratio between the spur gear 12 and the spur gear 15 may be set to 1:2 in advance in order to meet a demand that one wishes to frequently use an emission pattern with which the mirror 18 is rotated faster in the vertical direction than in the horizontal direction.

While the aforementioned description illustrates the example of radiating light from the light source 17 into the three-dimensional space, the light source 17 may also be provided with a light reception unit receiving reflected light of the light emitted from the light source 17 to be able to configure the device as a radar device or rangefinder.

Second Embodiment

Figure 5:
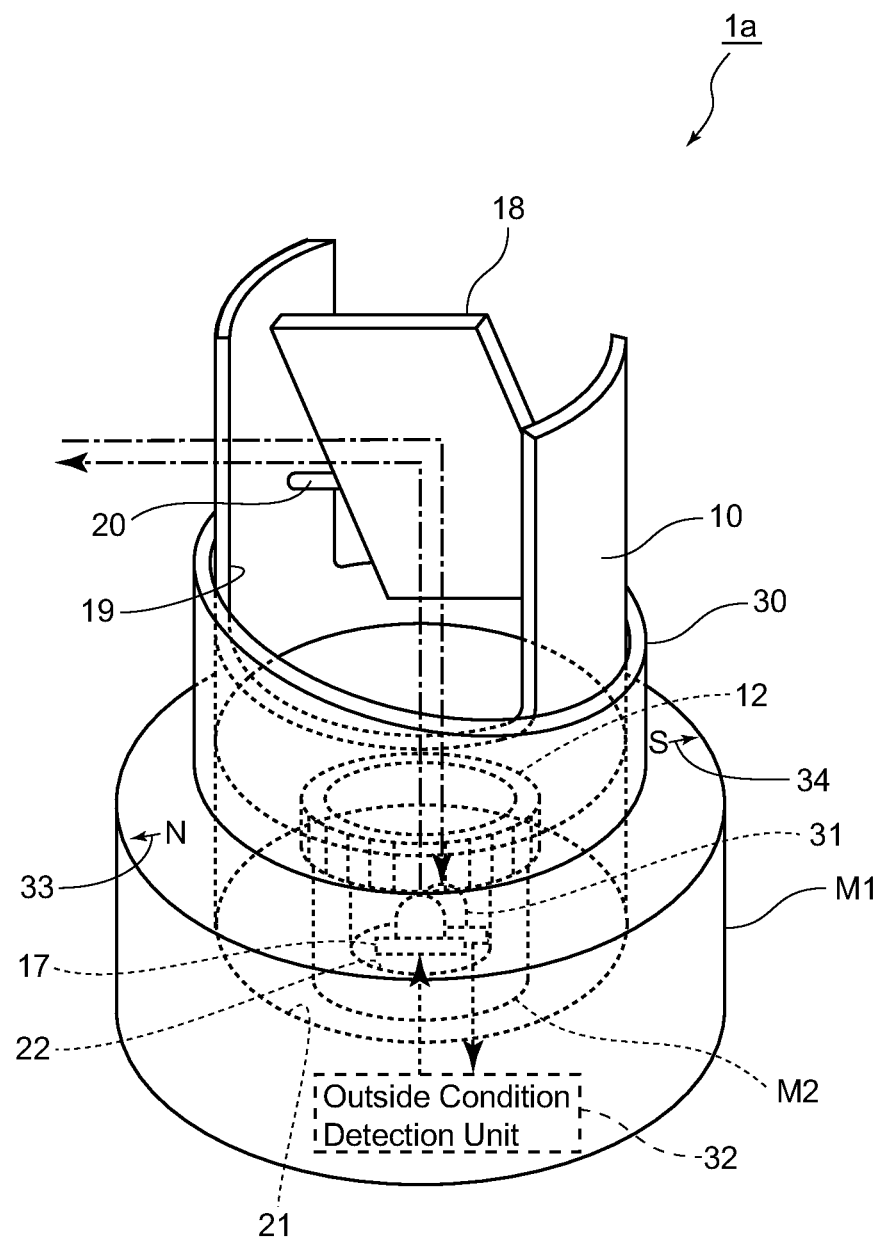
FIG. 5 is a diagram illustrating a configuration of a principal part of a three-dimensional drive device according to a second embodiment of the present invention.

A three-dimensional drive device 1a according to a second embodiment of the present invention will be described with reference to FIGS. 5 and 6. The three-dimensional drive device 1a is partly different from the three-dimensional drive device 1. Accordingly, a member identical or similar to that of the three-dimensional drive device 1 will be assigned a reference numeral identical or similar to that of the three-dimensional drive device 1.

The three-dimensional drive device 1a is configured to further include, along an outer periphery of the hollow shaft 10 of the three-dimensional drive device 1, a wall surface 30 with the height thereof varying according to a circumferential position. The three-dimensional drive device 1a further includes a light reception unit 31 in addition to the light source 17 of the three-dimensional drive device 1. The device further includes an outside condition detection unit 32 detecting a condition of the outside on the basis of a direction in which light emitted from the light source 17 is radiated to the outside (namely, a scanning direction) as well as a result of a comparison between the light emitted from the light source 17 and return light received by the light reception unit 31. As a result, the three-dimensional drive device 1a can have a function as a radar device or rangefinder. An example of the aforementioned result of the comparison is time elapsed (a difference in time) from when the light emitted from the light source 17 becomes the return light to when it is received by the light reception unit 31.

A method of using the wall surface 30 of the three-dimensional drive device 1a will be described below.

The three-dimensional drive device 1a as the radar device or rangefinder is placed at a predetermined position in space such as a room, a surrounding condition of which is to be observed, and operates the function as the radar device or rangefinder. On this case, when the spur gear 15 is set to rotate at least twice while the hollow shaft 10 rotates once, an inner peripheral surface of the wall surface 30 is scanned for the total of four times with the front and back of the mirror 18. The condition of the wall surface 30 nearest the hollow shaft 10 is thus detected by the outside condition detection unit 32. That is, the outside condition detection unit 32 detects a distance from a predetermined reference point of measurement such as the position of the light source 17 to the inner peripheral surface of the wall surface 30, for example. The height of the wall surface 30 (an upper rim of the wall surface 30) at this time can be easily detected as a position at which a measured distance varies sharply (gets longer) in the vertical direction. The height of the wall surface 30 is configured to vary in the circumferential direction. Therefore, one can examine the height of the wall surface 30 to be able to identify a site having that height on the wall surface 30 in the circumferential direction.

Figure 6:
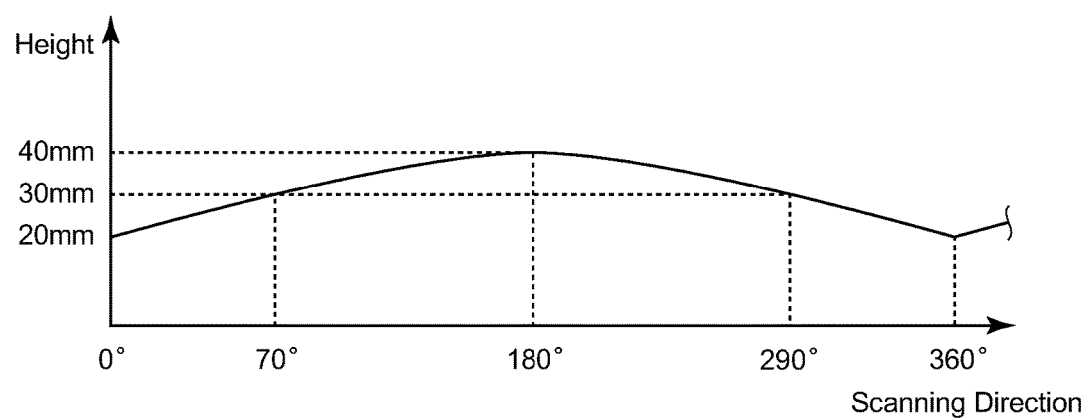
FIG. 6 is a graph illustrating a relationship between the height of a wall surface illustrated in FIG. 5 and a scanning direction.

FIG. 6 illustrates a detected result of the height of the wall surface 30 detected as described above. FIG. 6 has a horizontal axis representing the scanning direction and a vertical axis representing the height of the wall surface 30. FIG. 6 illustrates an example in which the scanning direction equals 0 degree (=360 degrees) at the lowest position (20 mm in FIG. 6) of the wall surface 30 and equals 180 degrees at the highest position (40 mm in FIG. 6) of the wall surface 30. Accordingly, one can identify the scanning direction with respect to the height of the wall surface 30 between 0 and 180 degrees or 180 and 360 degrees. One can also examine whether the scanning direction is between 0 and 180 degrees or 180 and 360 degrees by examining whether the detected result of the wall surface 30 increases gradually or decreases gradually as time passes.

As illustrated in FIG. 6, for example, one can identify the scanning direction to be 70 degrees or 290 degrees when the height of the wall surface 30 equals 30 mm. Here, the scanning direction is 70 degrees when the detected result of the height of the wall surface 30 increases gradually as time passes or 290 degrees when the result decreases gradually as time passes.

Moreover, one can identify which of north, south, east and west the scanning direction of the radar device or rangefinder corresponds to by, for example, setting bearing indicators 33 and 34 marked on a casing of the three-dimensional drive device 1a to point north and south, respectively. Accordingly, a position at which the height of the wall surface 30 is the lowest directly corresponds to north (0 degree) of a magnetic pole, and a position at which the height of the wall surface 30 is the highest directly corresponds to south (180 degrees) of the magnetic pole.

Note that the minimum value of the height of the wall surface 30 is preferably aligned with the height of a lower rim of a notch 19, for example. This can avoid failing to detect the upper rim of the wall surface 30 hidden by the lower rim of the notch 19. Moreover, the maximum value of the height of the wall surface 30 is set twice (40 mm) the minimum value (20 mm) in the example illustrated in FIG. 6 but, in order to not interfere with the light emitted from the light source 17, it is preferred that a difference between the maximum value and the minimum value of the height of the wall surface 30 be small. It is therefore preferred to set the difference between the maximum value and the minimum value of the height of the wall surface 30 as small as possible according to the resolution of the outside condition detection unit 32.

The outside condition detection unit 32 can thus identify the scanning direction on the basis of the detected result of the height of the wall surface 30. As a result, the outside condition detection unit 32 can detect the condition of the outside on the basis of the scanning direction as well as the time elapsed (the difference in time) from when the light emitted from the light source 17 becomes the return light to when it is received by the light reception unit 31.

In order for one to know the scanning direction of the radar device or rangefinder, it is conventionally required to separately prepare a device such as a rotary encoder that detects the direction of light being radiated. On the other hand, according to the three-dimensional drive device 1a, the provision of the simple wall surface 30 can allow one to know the scanning direction of the radar device or rangefinder without providing an expensive device such as the rotary encoder.

Another Embodiment

In the aforementioned embodiment, the light source 17 or the light reception unit 31 is arranged in the hollow structure 16 of the hollow shaft motor M2 or along the central axis 11. While such arrangement of the light source 17 or the light reception unit 31 is advantageous in terms of cost and man hours involved in producing the device, the arrangement may be changed to another position when one does not take into account the cost and man hours involved in the production. There may be provided a column in an upper part of the hollow shaft 10 to arrange the light source 17 or the light reception unit 31 above the mirror 18, for example. In this case, power can be fed to the light source 17 or the light reception unit 31 via a slip ring used to supply power to a rotating body.

Moreover, while the hollow shaft motors M1 and M2 are described as a source of power in the aforementioned embodiment, the source of power is not limited to the hollow shaft motor. Projections and depressions may be provided along the outer periphery of the rotary shaft 10, which is rotated by a motor with a gear wheel in mesh with the projections and depressions, and a motor with a gear wheel in mesh with the spur gear 12 may be installed inside the rotary shaft 10 to rotate the spur gear 12 with the motor, for example.

The invention claimed is:

1. A three-dimensional drive device comprising:
   a hollow shaft;
   a first motor for rotating the hollow shaft in a circumferential direction;
   a first spur gear having a central axis common to a central axis of the hollow shaft, arranged within a center of the hollow shaft, the first spur gear having a hollow structure on a side of the central axis;
   a second motor for rotating the first spur gear in the circumferential direction;
   a bevel gear meshing with the first spur gear, arranged within the hollow shaft;
   a second spur gear meshing with the bevel gear, arranged within the hollow shaft, and having an axis of rotation orthogonal to the central axis of the hollow shaft,
   the bevel gear and the second spur gear being to turn upon moving in the circumferential direction of the hollow shaft along with rotation of the hollow shaft, and
   the central axis of the hollow shaft and the axis of rotation of the second spur gear being orthogonal to each other;
   a light source for emitting light in a direction of the central axis of the first spur gear; and
   a mirror attached to the axis of rotation of the second spur gear for reflecting light emitted from the light source, an angle of a reflecting surface thereof being changed by rotation of the second spur gear.

2. The three-dimensional drive device according to claim 1, wherein the hollow shaft is provided with a notch at a part of an outer wall thereof in order to not block a path of light reflected off of the mirror.

3. The three-dimensional drive device according to claim 1, further comprising a control unit for adjusting a difference between a rotational speed of the first motor and a rotational speed of the second motor.

4. The three-dimensional drive device according to claim 1, further comprising: a light reception unit provided along with the light source for receiving return light of the light emitted from the light source; and an outside condition detection unit for detecting a condition of the outside on the basis of a radiation direction of the light emitted from the light source and radiated to the outside as well as a result of a comparison between the light emitted from the light source and the return light received by the light reception unit.

5. The three-dimensional drive device according to claim 4, further comprising a wall surface formed along an outer periphery of the hollow shaft and having a height varying according to a position in the circumferential direction.

6. The three-dimensional drive device according to claim 1, wherein the mirror is attached to the axis of rotation of the second spur gear for reflecting light directly emitted from the light source.

* * * * *